United States Patent Office 3,849,408
Patented Nov. 19, 1974

3,849,408
4-SUBSTITUTED-Δ²-CEPHALOSPORIN DERIVATIVES
Joseph Edward Dolfini, Princeton, N.J., assignor to E. R. Squibb & Sons, Inc., Princeton, N.J.
No Drawing. Continuation-in-part of abandoned application Ser. No. 139,861, May 3, 1971. This application Mar. 31, 1972, Ser. No. 240,111
Int. Cl. C07d 99/24
U.S. Cl. 260—243 C       4 Claims

ABSTRACT OF THE DISCLOSURE

Disclosed herein are antibiotics of the cephalosporin class which are substituted in the 4-position. These compounds have been found to be useful as antibacterial agents.

This application is a continuation-in-part of copending application Ser. No. 139,861, now abandoned filed May 3, 1971.

BACKGROUND OF INVENTION

A recent group of broad spectrum antibiotic which has been classified as cephalosporins has the following Formula I:

(I)
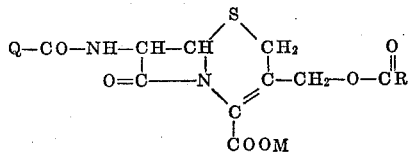

wherein Q represents essentially any organic radical, as exemplified by hundreds of examples in the prior art, M represents a pharmaceutically acceptable cation and R is a hydrocarbon, has recently come to the forefront as possessing exceptional antibacterial properties.

There have been various modifications of this basic moiety, however, to date any attempt to put a radical in the 4-position of the cephalosporin moiety has been unsuccessful.

SUMMARY OF INVENTION

The present invention relates to a process for preparing compounds of the cephalosporin class having the formula II:

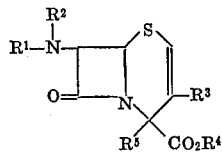
II wherein $R^1$ annd $R^2$ are acyl, alkyl, hydrogen, triphenylmethyl, and trimethylsilyl; or

taken together form a cyclic imide group; $R^3$ is alkyl, aralkyl, 3-N-pyridinium methyl or a radical of the formula:

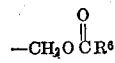

wherein $R^6$ is alkyl or phenyl; $R^4$ is hydrogen, alkyl, aralkyl, trimethylsilyl, aryl, a metal cation, ammonium salt, amine salt or X-substituted alkyl or aralkyl wherein X is amino, nitro, alkoxy, halogen, nitro, trifluoromethyl; $R^5$ is alkyl aralkyl, arylalkoxalkyl or Y-substituted alkyl or aralkyl wherein Y is aminoalkylamino, nitro, alkoxy, halogen, trifluoromethyl, carboxy, carboxamido, tosylate, brosylate and quaternary amine.

Acyl is defined in this invention as:

(a)
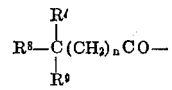

wherein $R^7$, $R^8$ and $R^9$ are hydrogen, alkyl, cycloalkyl, cycloalkenyl, cycloalkadienyl, alkoxyalkyl, alkoxyalkoxyalkyl, thienyl, substituted thienyl, phenyl, substituted phenyl, phenoxy, substituted phenoxy, amino, nitro, halogen, mercapto, alkylmercapto, alkylmercaptoalkyl, phenylthio and substituted phenylthio wherein the substituents of the thienyl, phenyl, phenoxy, and phenylthio may be one or more of the following alkyl, alkoxy, halogen, nitro, amino and trifluoromethyl and n is either O or an integer from 1 to 4.

(b) $R^{10}CO$— wherein $R^{10}$ is hydrogen, amino, phenyl, substituted phenyl, alkoxy, thienyl, substituted thienyl, phenoxy, alkylthio, substituted phenoxy, β-alkenyl, β-alkylthioalkenyl, β-alkoxyalkenyl and β-alkenyloxyalkyl, wherein the substituents on the thienyl, phenyl and phenoxy may be one or more of the following: alkyl, alkoxy, halo, nitro, amino, and trifluoromethyl.

Alkyl is defined as having one to six carbon atoms. This definition also applies to terms incorporating alkyl with other groups, such as aralkyl which is intended to mean an aryl group linked to an alkyl group having one to six carbon atoms.

Aryl is defined as phenyl and α- and β-naphthyl.

The compounds of the invention are prepared by reacting approximately equimolar amounts of an S-oxide derivative of cephalosporin having the formula III:

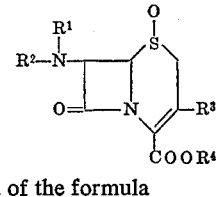
III with a compound of the formula $R^5Z$ wherein $R^5$ is as defined herein and Z is a typical "leaving group" such as iodo, chloro, bromo, tosylate, brosylate, quaternary amino, etc. to yield a compound of the formula IV:

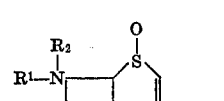
IV

The above reaction is conducted in the presence of a base which removes a proton from the 2-position, thus forming an anion in the cephalosporin moiety. Generally, a strong inorganic or organic base such as potassium hydroxide, sodium hydride, potassium t-butoxide, triphenylmethyl sodium, sodium methoxide, triton-β may be utilized.

The intermediate of Formula IV is then reduced by known methods (see Kaiser et al., J. Org. Chem., 35, 2430 [1970]) to yield the compound of formula V:

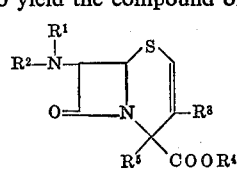
V wherein $R^1$, $R^2$, $R^3$, $R^4$ and $R^5$ are as defined above. Hydrolysis of this compound gives the corresponding 7-aminocephalosporanic acid having the formula VI:

$$\begin{array}{c} R^2 \\ | \\ R^1-N-\phantom{xx}S \\ \phantom{xxx}|\phantom{xx}| \\ O=\phantom{xx}N\phantom{x}-R^3 \\ \phantom{xxxx}R^5\phantom{x}COOR \end{array} \quad VI$$

wherein $R^1$ and $R^2$ are hydrogen, $R^3$ and $R^5$ are as defined above. This compound may then be acylated by methods known to the art to produce new, valuable compounds in particular wherein $R^1=H$ and $R^2=$acyl.

DETAILED DESCRIPTION OF INVENTION

The compounds of formula IV above are prepared by reacting a compound of formula III with a $R^5Z$ in the presence of a base such as alkali metal hydride (e.g., sodium hydride, potassium hydride), alkali metal hydroxide (e.g., sodium hydroxide, potassium hydroxide or lithium hydroxide), alkali metal alkoxide (e.g., sodium ethoxide or potassium t-butoxide), triton β, etc. in the presence of an organic solvent of the aromatic type such as benzene, toluene, chlorobenzene, methoxybenzene, etc.; ethereal solvents such as ether, dimethoxyethane and tetrahydrofuran, alcoholic solvents such as methanol, ethanol isopropanol and t-butanol and other common reagents such as acetonitrile, nitromethane, dimethylformamide and acetone, and mixtures thereof. This reaction is carried out at a temperature of from about $-20°$ C. to $+50°$ C., preferably $-10°$ C. to about $+10°$ C. It should be noted that milder bases may be employed with higher temperatures to achieve the same result. The novel intermediates of formula IV are thus formed and then isolated by conventional means. Reduction of the compounds are achieved by treatment in an organic solvent which is inert to the reducing agent, such as methylene chloride, ethylene chloride, etc. with one equivalent of phosphorus trichloride or an acyl halide followed by passing the compound over zinc dust at temperatures of about $-20°$ C. to about $+30°$ C. yielding the desired compounds having the formula V. As mentioned above one equivalent of a base may be utilized in carrying out the substitution of $R^5$ in the 4-position. However, should $R^4$ be hydrogen, it is preferred to utilize two equivalents of base during the alkylation process.

Compound VI, wherein $R^1$ and $R^2=H$, which is also a novel intermediate, can be acylated by one of the following methods:

(a) Reaction of the compound of general formula VI with an acid chloride, acid anhydride, active ester or acid azide.

(b) Reaction of the compound of general formula VI with a carboxylic acid activated by reaction with a carbonyl-diimidazole, dicyclohexylcarbodiimide or similar activating agent; in addition, a mixed anhydride of an acid corresponding to the desired acyl group and another acid employed, the mixed anhydride being formed separately or *in situ* by reaction of the acid corresponding to the desired acyl group with an alkyl haloformate, the reaction with the mixed anhydride preferably being conducted in solution in an anhydrous, inert solvent in the presence of an acid binding agent e.g., a tertiary amine.

EXAMPLE 1

Preparation of methyl 3,4-dimethyl-7-phenoxyacetamido-Δ²-cephem-4-carboxylate, S-oxide 2.64 mmoles of methyl 3-methyl-7-phenoxyacetamido-Δ³-cephem-4-carboxylate sulfoxide (the Netherlands Pat. No. 6910830) was dissolved in 20 ml. dimethylformamide and cooled to 0° C. To this was added 2.64 mmoles of methyl iodide and 2.64 mmole sodium hydride in mineral oil. After stirring 2½ hours at 0° C. the starting material was used up and one major product was visible by TLC. The reaction was quenched with water and the products extracted in ethyl acetate. The organic layer was washed three times with water. The product was crystallized from chloroform and ether.

M.P. 164–168°.

EXAMPLE 2 p-Methoxybenzyl 3,4-dimethyl-7-phenoxyacetamido-Δ²-cephem-4-carboxylate, S-oxide The use of 2.64 mmole of the p-methoxybenzyl ester of 7-phenoxyacetamidocephalosporanic acid s-oxide in the provious procedure give the desired product.

EXAMPLE 3

3,4-Dimethyl-7-phenoxyacetamido-Δ²-cephem-4-carboxylic acid, S-oxide

A solution of 1 mmole of the product of Example 2 and 1 mmole of anisole in 5 ml. chlloroform is treated with 1 ml. trifluoroacetic acid at room temperature for 1 hour. The solution is evaporated at reduced pressure and the portioned between ethyl acetate/water to which dil. aqueous sodium hydroxide is added to give a pH of 7.5. The aqueous layer is then separated, layered with fresh ethyl acetate and acidified to pH 2 with dil. HCl. The ethyl acetate layer is then dried ($Na_2SO_4$), filtered and evaporated to deposite the product.

EXAMPLE 4 p-Methoxybenzyl 3,4-dimethyl-7-phenoxyacetamido-Δ²-cephem-4-carboxylate

A solution of 1 mmole of the product of Example 2 is treated with 1 mmole of $PCl_3$ in 20 ml. of $CH_2Cl_2$ at reflux for 10 minutes. The resulting (cooled) solution is washed with 5% aqueous sodium bicarbonate, then dried ($MgSO_4$), filtered and evaporated at reduced pressure to deposit the product.

EXAMPLE 5

3,4-dimethyl-7-phenoxy-acetamido-Δ²-cephem-4-carboxylic acid

By using the product of Example 4 as the substrate in Example 3, the desired product is obtained.

EXAMPLE 6

7-amino-3,4-dimethyl-Δ²-cephem-4-carboxylate, p-methoxybenzyl ester

A solution of the product of Example 4 (7.8 mmole) in dry benzene (200 ml.) containing 2.2 g. of pyridine at 65±5° C. is treated with $PCl_5$, 5.9 g. for 2 hours. After cooling 420 ml. $CH_3OH$ is carefully added. After 10 hours, the solvents are removed at reduced pressure and the residue treated with 1:1 $THF/H_2O$ for 2 hours, followed by evaporation of the THF to reduced pressure. The solution is adjusted to pH 7.5 and is extracted with ethyl acetate. The ethyl acetate layer is dried ($Na_2SO_4$) and evaporated at reduced pressure to deposit the product.

EXAMPLE 7

7-amino-3,4-dimethyl-Δ²-cephem-4-carboxylic acid (a) One gram of the product of Example 6 is suspended in 30 ml. water and the pH adjusted to 3.0 with 1N HCl. After stirring overnight, the product is filtered off, washed with water and dried.

(b) The product (7.8 mmole) of Example 5 is treated with 7.8 mmole pyridine and 7.8 mmole of trimethyl chlorosilane in 250 ml. benzene, and then, following the procedure of Example 6, with 2.2 g. of pyridine and 5.9 g. $PCl_5$ at 65±5° C. for 2 hours, followed by adding 420 ml. $CH_3OH$ to the cooled solution. After 10 hours the solvents are removed at reduced pressure. The residue is treated with 100 ml. $H_2O$ and formic acid to a pH of 3.0 for 2 hours at room temperature, the pH being adjusted to 3.0 for 2 hours at room temperature, the pH being adjusted to 3.0 continuously if necessary. The product is filtered off, washed with water and dried.

EXAMPLE 8

7-phenylacetamido-3,4-dimethyl-$\Delta^2$-cephem-4-carboxylic acid, p-methoxybenzyl ester 3.25 meq. 7-amino - 3,4 - dimethyl-$\Delta^2$-cephem-4-carboxylic acid, p-methoxybenzyl ester are dissolved in 30 ml. chloroform, and cooled to ice-bath temperature under nitrogen. Then 3.25 meq. triethylamine are added followed by the addition of 3.25 meq. phenylacetylchloride. The reaction is allowed to proceed for two hours at ice-bath temperatures and under nitrogen. The solution is diluted with chloroform, washed with an aqueous solution at pH 7.2, washed with water, dried over magnesium sulphate, and evaporated to dryness to give 1.7 meq. of desired product.

EXAMPLE 9

7-phenylacetamido-3,4-dimethyl-$\Delta^2$-cephem-4-carboxylic acid (a) The product of Example 7 as a solution with triethylamine in 1:1 water/acetone at 0° C. is treated with one equivalent of phenylacetyl chloride, with triethylamine being added to maintain pH at 6.5 to 7.5. When no further pH change is noted the reaction is worked up by evaporation (vacuum) of acetone, extracted with ethyl acetate. The aqueous is acidified and extracted with ethyl acetate. The organic layer is dried (with $Na_2SO_4$) and evaporated at reduced pressure to deposit the product.

(b) By treatment of 7-phenylacetamido - 3,4 - dimethyl-$\Delta^2$-cephem - 4 - carboxylic acid, p-methoxybenzyl ester in benzene with 2.1 mmoles anisole and 3.5 mmoles trifluoroacetic acid for 6 hours. The desired product is extracted from the acid solution in good yield.

EXAMPLES 10–32

By following the procedure of Example 9(a) and substituting an equivalent amount of the corresponding acid chloride of the following carboxylic acids α-(2-chlorophenoxy)propionic acid,
α-(4-sulfamylphenoxy)-n-butyric acid,
α-(3,4-dimethoxyphenoxy)-n-pentanoic acid,
α-(3-methylphenoxy)isovaleric acid,
α-(4-methylthiophenoxy)propionic acid,
α-(4-dimethylaminophenoxy)-n-hexanoic acid,
α-(2-methoxyphenoxy)-n-decanoic acid,
α-(2,4-dichlorophenoxy)phenylacetic acid,
α-(2-nitrophenoxy)-β-phenylpropionic acid,
α-(2-acetamidophenoxy)-γ-phenylbutyric acid,
α-(2,4-dimethylphenoxy)-n-butyric acid,
α-(4-isopropylphenoxy)propionic acid,
α-(3-bromophenoxy)-n-butyric acid,
α-(2-iodophenoxy)phenylacetic acid,
α-(2-diethylaminophenoxy)isovaleric acid,
α-(3,5-dichlorophenoxy)isohexanoic acid,
α-(4-cyclohexylphenoxy) propionic acid,
α-phenoxy-isovaleric acid,
α-phenoxy-n-decanoic acid,
α-phenoxy-γ-phenylbutyric acid,
α-2-benzylphenoxy)-n-butyric acid,
α-(2-trifluoromethylphenoxy)propionic acid, and
α-(4-fluorophenoxy)propionic acid, the $\Delta^2$ products obtained are 7-[α-(2-chlorphenoxy)propionamido]-3,4-dimethyl-$\Delta^2$-cephem-4-carboxylic acid,
7-[α-(4-sulfamylphenoxy)-n-butyramido]-3,4-dimethyl-$\Delta^2$-cephem-4-carboxylic acid,
7-[α-(3,4-dimethoxyphenoxy)-n-pentanoamido]3,4-dimethyl-$\Delta^2$-cephem-4-carboxylic acid,
7-[α-(3-methylphenoxy)isovaleramido]-3,4-dimethyl-$\Delta^2$-cephem-4-carboxylic acid,
7-[α-(4-methylthiophenoxy)propionamido]-3,4-dimethyl-$\Delta^2$-cephem-4-carboxylic acid,
7-[α-(4-dimethylaminophenoxy)-n-hexanoamido]-3,4-dimethyl-$\Delta^2$-cephem-4-carboxylic acid,
7-[α-(2-methoxyphenoxy)-n-decanoamido]-3,4-dimethyl-$\Delta^2$-cephem-4-carboxylic acid,
7-[α-(2,4-dichlorophenoxy)phenylacetamido]-3,4-dimethyl-$\Delta^2$-cephem-4-carboxylic acid,
7-[α-(2-nitrophenoxy)-β-phenylpropionamido]-3,4-dimethyl-$\Delta^2$-cephem-4-carboxylic acid,
7-[α-(2-acetamidophenoxy)-γ-phenylbutyramido]-3,4-dimethyl-$\Delta^2$-cephem-4-carboxylic acid,
7-[α-(2,4-dimethylphenoxy)-n-butyramido]-3,4-dimethyl-$\Delta^2$-cephem-4-carboxylic acid,
7-[α-(4-isopropylphenoxy)propionamido]-3,4-dimethyl-$\Delta^2$-cephem-4-carboxylic acid,
7-[α-(3-bromophenoxy)-n-butyramido]-3,4-dimethyl-$\Delta^2$-cephem-4-carboxylic acid,
7-[α-(2-iodophenoxy)phenylacetamido]-3,4-dimethyl-$\Delta^2$-cephem-4-carboxylic acid,
7-[α-(2-diethylaminophenoxy)isovaleramido]-3,4-dimethyl-$\Delta^2$-cephem-4-carboxylic acid,
7-[α-(3,5-dichlorophenoxy)isohexanoamido]-3,4-dimethyl-$\Delta^2$-cephem-4-carboxylic acid,
7-[α-(4-cyclohexylphenoxy)propionamido]-3,4-dimethyl-$\Delta^2$-cephem-4-carboxylic acid,
7-[α-phenoxy-isovaleramido]-3,4-dimethyl-$\Delta^2$-cephem-4-carboxylic acid,
7-[α-phenoxy-n-decanoamido]-3,4-dimethyl-$\Delta^2$-cephem-4-carboxylic acid,
7-[α-phenoxy-γ-phenylbutyramido]-3,4-dimethyl-$\Delta^2$-cephem-4-carboxylic acid,
7-[α-(2-benzylphenoxy)-n-butyramido]-3,4-dimethyl-$\Delta^2$-cephem-4-carboxylic acid,
7-[α-(2-trifluoromethylphenoxy)propionamido]-3,4-dimethyl-$\Delta^2$-cephem-4-carboxylic acid, and
7-[α-(4-fluorophenoxy)propionamido]-3,4-dimethyl-$\Delta^2$-cephem-4-carboxylic acid, respectively.

EXAMPLES 33–62

By the following the procedure of Example 9(a) and substituting an equivalent amount of the corresponding acid chloride of the following carboxylic acids α-phenylthiopropionic acid,
α-paranitrophenylthiopropionic acid,
α-parachlorophenylthiopropionic acid,
α-phenylthiobutyric acid,
α-phenylthiocaproic acid,
α-phenylthioisovaleric acid,
α-(4-t-butylphenylthio)propionic acid,
α-ortho-tolythiopropionic acid,
α-ortho-nitrophenylthiopropionic acid,
α-parachlorophenylthiobutyric acid,
α-(3,4,5-trifluoromethylphenylthio)propionic acid,
α-(3-trifluoromethylphenylthio)butyric acid,
α-parabromophenylthioisovaleric acid,
α-paraphenylphenylthiopropionic acid,
α-(4-methoxyphenylthio)caproic acid,
α-(4-cyclohexylphenylthio)butyric acid,
α-phenylthio-α-cyclohexylacetic acid,
α-phenylthio-α-cyclopentylacetic acid,
α-(2,4-dichlorophenylthio)caproic acid,
α-(2,4-diisoamylphenylthio)propionic acid,
α-(4-benzylphenylthio)propionic acid,
α-(4-sulfamylphenylthio)butyric acid,
α-(2-allyloxyphenylthio)propionic acid,
α-(4-allylphenylthio)isovaleric acid,
α-(4-dimethylaminophenylthio)propionic acid,
α-(2,5-dichlorophenylthio)butyric acid,
α-(2-iodophenylthio)propionic acid,
α-(2-acetamidophenylthio)propionic acid,
α-(4-diethylaminophenylthio)propionic acid, and
α-(3-fluorophenylthio)butyric acid, the products obtained are 7-(α-phenylthiopropionamido)-3,4-dimethyl-Δ²-cephem-4-carboxylic acid,
7-(α-paranitrophenylthiopropionamido)-3,4-dimethyl-Δ²-cephem-4-carboxylic acid,
7-(α-parachlorophenylthiopropionamido)-3,4-dimethyl-Δ²-cephem-4-carboxylic acid,
7-(α-phenylthiobutyramido)-3,4-dimethyl-Δ²-cephem-4-carboxylic acid,
7-(α-phenylthiocaproamido)-3,4-dimethyl-Δ²-cephem-4-carboxylic acid,
7-(α-phenylthioisovaleramido)-3,4-dimethyl-Δ²-cephem-4-carboxylic acid,
7-[α-(4-t-butylphenylthio)propionamido]3,4-dimethyl-Δ²-cephem-4-carboxylic acid,
7-[α-ortho-tolylthiopropionamido]-3,4-dimethyl-Δ²-cephem-4-carboxylic acid,
7-(α-orthonitrophenylthiopropionamido)-3,4-dimethyl-Δ²-cephem-4-carboxylic acid,
7-(α-parachlorophenylthiobutyramido)-3,4-dimethyl-Δ²-cephem-4-carboxylic acid,
7-[α-(3,4,5-trichlorophenylthio)propionamido]-3,4-dimethyl-Δ²-cephem-4-carboxylic acid,
7-[α-(3-trifluoromethylphenylthio)butyramido]-3,4-dimethyl-Δ²-cephem-4-carboxylic acid,
7-(α-parabromophenylthioisovaleramido)-3,4-dimethyl-Δ²-cephem-4-carboxylic acid,
7-(α-paraphenylphenylthiopropionamido)-3,4-dimethyl-Δ²-cephem-4-carboxylic acid,
7-[α-(4-methoxyphenylthio)caproamido]-3,4-dimethyl-Δ²-cephem-4-carboxylic acid,
7-[α-(4-cyclohexylphenylthio)butyramido]-3,4-dimethyl-Δ²-cephem-4-carboxylic acid,
7-(α-phenylthio-α-cyclohexylacetamido)-3,4-dimethyl-Δ²-cephem-4-carboxylic acid,
7-(α-phenylthio-α-cyclopentylacetamido)-3,4-dimethyl-Δ²-cephem-4-carboxylic acid,
7-[α-(2,4-dichlorophenylthio)caproamido]-3,4-dimethyl-Δ²-cephem-4-carboxylic acid,
7-[α-(2,4-diisoamylphenylthio)propionamido]-3,4-dimethyl-Δ²-cephem-4-carboxylic acid,
7-[α-(4-benzylphenylthio)propionamido]-3,4-dimethyl-Δ²-cephem-4-carboxylic acid,
7-[α-(4-sulfamylphenylthio)butyramido]-3,4-dimethyl-Δ²-cephem-4-carboxylic acid,
7-[α-(2-allyloxyphenylthio)propionamido]-3,4-dimethyl-Δ²-cephem-4-carboxylic acid,
7-[α-(4-allylphenylthio)isovaleramido]-3,4-dimethyl-Δ²-cephem-4-carboxylic acid,
7-[α-(4-dimethylaminophenylthio)propionamido]-3,4-dimethyl-Δ²-cephem-4-carboxylic acid,
7-[α-(2,5-dichlorophenylthio)butyromido]-3,4-dimethyl-Δ²-cephem-4-carboxylic acid,
7-[α-(2-iodophenylthio)propionamido]-3,4-dimethyl-Δ²-cephem-4-carboxylic acid,
7-[α-(2-acetamidophenylthio)propionamido]-3,4-dimethyl-Δ²-cephem-4-carboxylic acid,
7-[α-(4-diethylaminophenylthio)propionamido]-3,4-dimethyl-Δ²-cephem-4-carboxylic acid,
7-[α-(3-fluorophenylthio)butyramido]3,4-dimethyl-Δ²-cephem-4-carboxylic acid, respectively.

EXAMPLES 63–76

By following the procedure of Example 9(a) and substituting an equivalent amount of the corresponding acid chloride hydrochloride of the following carbxylic acids D,L-α-amino-(3-thienyl)acetic acid,
α-amino-(5-ethyl-2-thienyl)acetic acid,
α-amino-(5-methyl-2-thienyl)acetic acid,
α-amino-(5-t-butyl-2-thienyl)acetic acid,
α-amino-(2,5-dimethyl-3-thienyl)acetic acid,
α-amino-(5-chloro-2-thienyl)acetic acid,
α-amino-(5-bromo-2-thienyl)acetic acid,
α-amino-(5-phenyl-3-chloro-2-thienyl)acetic acid,
α-amino-(3,5-dimethyl-2-thienyl)acetic acid,
α-amino-(5-cyclohexyl-2-thienyl)acetic acid,
αamino-(5-diethylamino-2-thienyl)acetic acid,
α-amino-(4-methylsulfonyl-2-thienyl)acetic acid,
α-amino-(3-ethylthio-2-thienyl)acetic acid, and
α-amino-(4-cycloheptyloxy-2-thienyl)acetic acid, the products obtained are D,L-7-[α-amino-(3-thienyl)acetamido]-3,4-dimethyl-Δ²-cephem-4-carboxylic acid,
7-[α-amino-(5-ethyl-2-thienyl)acetamido]-3,4-dimethyl-Δ²-cephem-4-carboxylic acid,
7-[α-amino-(5-methyl-2-thienyl)acetamido]-3,4-dimethyl-Δ²-cephem-4-carboxylic acid,
7-[α-amino-(5-t-butyl-2-thienyl)acetamido]-3,4-dimethyl-Δ²-cephem-4-carboxylic acid,
7-[α-amino-(2,5-dimethyl-3-thienyl)acetamido]-3,4-dimethyl-Δ²-cephem-4-carboxylic acid,
7-[α-amino-(5-chloro-2-thienyl)acetamido]-3,4-dimethyl-Δ²-cephem-4-carboxylic acid,
7-[α-amino-(5-bromo-2-thienyl)acetamido]-3,4-dimethyl-Δ²-cephem-4-carboxylic acid,
7-[α-amino-(5-phenyl-3-chloro-2-thienyl)acetamido]-3,4-dimethyl-Δ²-cephem-4-carboxylic acid,
7-[α-amino-(3,5-dimethyl-2-thienyl)acetamido]-3,4-dimethyl-Δ²-cephem-4-carboxylic acid,
7-[α-amino-(cyclohexyl-2-thienyl)acetamido]-3,4-dimethyl-Δ²-cephem-4-carboxylic acid,
7-[α-amino-(5-diethylamino-2-thienyl)acetamido]-3,4-dimethyl-Δ²-cephem-4-carboxylic acid,
7-[α-amino-(4-methylsulfonyl-2-thienyl)acetamido]-3,4-dimethyl-Δ²-cephem-4-carboxylic acid,
7-[α-amino-(3-ethylthio-2-thienyl)acetamido]-3,4-dimethyl-Δ²-cephem-4-carboxylic acid,
7-[α-amino-(4-cycloheptyloxy-2-thienyl)acetamido]-3,4-dimethyl-Δ²-cephem-4-carboxylic acid, respectively.

EXAMPLES 77–99

By following the procedure of Example 9(a) and substituting an equivalent amount of the corresponding acid chloride of the following carboxylic acids α-amino-p-chlorophenylacetic acid,
α-amino-p-methoxyphenylacetic acid,
L-(+)-α-aminophenylacetic acid,
α-amino-4-diethylaminophenylacetic acid,
α-amino-4-trifluoromethylphenylacetic acid,
α-amino-2,4-dibromophenylacetic acid,
α-amino-2-nitrophenylacetic acid,
α-amino-3-methylphenylacetic acid,
α-amino-4-sulfamylphenylacetic acid,
α-amino-2-iodophenylacetic acid,
α-amino-4-t-butylphenylacetic acid,
α-amino-2-acetamidophenylacetic acid,
α-amino-3-nitrophenylacetic acid,
α-amino-3,4-dimethoxyphenylacetic acid,
α-amino-4-dimethylaminophenylacetic acid,
α-amino-2,4-dichlorophenylacetic acid,
α-amino-4-isopropylphenylacetic acid,
α-amino-3-bromophenylacetic acid,
α-amino-3-iodophenylacetic acid,
α-amino-2-diethylaminophenylacetic acid,
α-amino-2-trifluoromethylphenylacetic acid,
α-amino-4-fluorophenylacetic acid, and
α-amino-3,4,5-trifluoromethylphenylacetic acid, the products obtained are 7-(α-amino-p-chlorophenylacetamido)-3,4-dimethyl-Δ²-cephem-4-carboxylic acid,
7-(α-amino-p-methoxyphenylacetamido)-3,4-dimethyl-Δ²-cephem-4-carboxylic acid,
7-[L-(+)-α-aminophenylacetamido]-3,4-dimethyl-Δ²-cephem-4-carboxylic acid, 7-(α-amino-4-diethylaminophenylacetamido)-3,4-dimethyl-Δ²-cephem-4-carboxylic acid,
7-(α-amino-4-trifluoromethylphenylacetamido)-3,4-dimethyl-Δ²-cephem-4-carboxylic acid,
7-(α-amino-2,4-dibromophenylacetamido)-3,4-dimethyl-Δ²-cephem-4-carboxylic acid,
7-(α-amino-2-nitrophenylacetamido)-3,4-dimethyl-Δ²-cephem-4-carboxylic acid,
7-(α-amino-3-methylphenylacetamido)-3,4-dimethyl-Δ²-cephem-4-carboxylic acid,
7-(α-amino-4-sulfamylphenylacetamido)-3,4-dimethyl-Δ²-cephem-4-carboxylic acid,
7-(α-amino-2-iodophenylacetamido)-3,4-dimethyl-Δ²-cephem-4-carboxylic acid,
7-(α-amino-4-t-butylphenylacetamido)-3,4-dimethyl-Δ²-cephem-4-carboxylic acid,
7-(α-amino-2-acetamidophenylacetamido)-3,4-dimethyl-Δ²-cephem-4-carboxylic acid,
7-(α-amino-3-nitrophenylacetamido)-3,4-dimethyl-Δ²-cephem-4-carboxylic acid,
7-(α-amino-3,4-dimethoxyphenylacetamido)-3,4-dimethyl-Δ²-cephem-4-carboxylic acid,
7-(α-amino-4-dimethylaminophenylacetamido)-3,4-dimethyl-Δ²-cephem-4-carboxylic acid,
7-(α-amino-2,4-dichlorophenylacetamido)-3,4-dimethyl-Δ²-cephem-4-carboxylic acid,
7-(α-amino-4-isopropylphenylacetamido)-3,4-dimethyl-Δ²-cephem-4-carboxylic acid,
7-(α-amino-3-bromophenylacetamido)-3,4-dimethyl-Δ²-cephem-4-carboxylic acid,
7-(α-amino-3-iodophenylacetamido)-3,4-dimethyl-Δ²-cephem-4-carboxylic acid,
7-(α-amino-2-diethylaminophenylacetamido)-3,4-dimethyl-Δ²-cephem-4-carboxylic acid,
7-(α-amino-2-trifluoromethylphenylacetamido)-3,4-dimethyl-Δ²-cephem-4-carboxylic acid,
7-(α-amino-4-fluorophenylacetamido)-3,4-dimethyl-Δ²-cephem-4-carboxylic acid, and
7-(α-amino-3,4,5-trifluoromethylphenylacetamido)-3,4-dimethyl-Δ²-cephem-4-carboxylic acid, respectively.

EXAMPLES 100–170

By following the procedure of Example 9(a) and substituting an equivalent amount of the corresponding acid chloride of the following carboxylic acids benzoyl chloride,
3,5-dinitrobenzoyl chloride,
2-chlorobenzoyl chloride,
2-methylbenzoyl chloride,
4-aminobenzoyl chloride,
4-nitrobenzoyl chloride,
4-hydroxybenzoyl chloride,
3,4,5-trimethoxybenzoyl chloride,
4-methylbenzoyl chloride,
4-chlorobenzoyl chloride,
3,4-dichlorobenzoyl chloride,
3-nitrobenzoyl chloride,
2,4,6-trimethoxybenzoyl chloride,
2-hydroxybenzoyl chloride,
4-ethoxybenzoyl chloride,
2,6-dimethoxybenzoyl chloride,
2,4,6-trimethylbenzoyl chloride,
2,6-dichlorobenzoyl chloride,
2,6-diethoxybenzoyl chloride,
2,6-di-n-butoxybenzoyl chloride,
2,6-dibenzyloxybenzoyl chloride,
2,3,6-trimethoxybenzoyl chloride,
2,4,6-tribromobenzoyl chloride,
2,6-di-n-propoxybenzoyl chloride,
2,6-dimethoxy-4-methylbenzoyl chloride,
4,6-diethyl-2-methoxybenzoyl chloride,
6-ethoxy-2-methoxybenzoyl chloride,
2-methylthiobenzoyl chloride,
2-benzylthiobenzoyl chloride,
2-phenoxybenzoyl chloride,
2-phenylbenzoyl chloride,
2-methoxybenzoyl chloride,
4-sulfamylbenzoyl chloride,
3,4-dimethoxybenzoyl chloride,
4-methoxybenzoyl chloride,
3-methylbenzoyl chloride,
3-dimethylaminobenzoyl chloride,
2-methoxybenzoyl chloride,
2-chloro-3,4,5-trimethoxybenzoyl chloride,
2,4-dichlorobenzoyl chloride,
2-nitrobenzoyl chloride,
4-methylaminobenzoyl chloride,
2-acetamidobenzoyl chloride,
2,4-dimethylbenzoyl chloride,
2,4,5-trimethylbenzoyl chloride,
4-isopropylbenzoyl chloride,
3-bromobenzoyl chloride,
2-iodobenzoyl chloride,
2-ethylaminobenzoyl chloride,
2,5-dihydroxybenzoyl chloride,
4-hydroxy-3-methoxybenzoyl chloride,
4-allylbenzoyl chloride,
4-allyloxybenzoyl chloride,
2-trifluoromethylbenzoyl chloride,
4-fluorobenzoyl chloride,
2-phenylthiobenzoyl chloride,
2-benzylbenzoyl chloride,
2,6-dihydroxybenzoyl chloride,
2,6-diacetoxybenzoyl chloride,
2,6-dimethylthiobenzoyl chloride,
2,4,6-trinitrobenzoyl chloride,
2,6-diacetamidobenzoyl chloride,
2,6-dibromobenzoyl chloride,
2,6-dimethylbenzoyl chloride,
2,6-diethylbenzoyl chloride,
2,6-diisopropylbenzoyl chloride,
2,6-diallyloxybenzoyl chloride,
3-bromo-2,6-dimethoxybenzoyl chloride,
4-chloro-2,6-dimethoxybenzoyl chloride,
2-chloro-6-nitrobenzoyl chloride, and
2-hydroxy-6-methoxybenzoyl chloride, the products obtained are 7-(benzamido)-3,4-dimethyl-Δ²-cephem-4-carboxylic acid,
7-(3,5-dinitrobenzamido)-3,4-dimethyl-Δ²-cephem-4-carboxylic acid,
7-(2-chlorobenzamido)-3,4-dimethyl-Δ²-cephem-4-carboxylic acid,
7-(2-methylbenzamido)-3,4-dimethyl-Δ²-cephem-4-carboxylic acid,
7-(4-aminobenzamido)-3,4-dimethyl-Δ²-cephem-4-carboxylic acid,
7-(4-nitrobenzamido)-3,4-dimethyl-Δ²-cephem-4-carboxylic acid,
7-(4-hydroxybenzamido)-3,4-dimethyl-Δ²-cephem-4-carboxylic acid,
7-(3,4,5-trimethoxybenzamido)-3,4-dimethyl-Δ²-cephem-4-carboxylic acid,
7-(4-methylbenzamido)-3,4-dimethyl-Δ²-cephem-4-carboxylic acid,
7-(4-chlorobenzamido)-3,4-dimethyl-Δ²-cephem-4-carboxylic acid,
7-(3,4-dichlorobenzamido)-3,4-dimethyl-Δ²-cephem-4-carboxylic acid,
7-(3-nitrobenzamido)-3,4-dimethyl-Δ²-cephem-4-carboxylic acid,
7-(2,4,6-trimethoxybenzamido)-3,4-dimethyl-Δ²-cephem-4-carboxylic acid,
7-(2-hydroxybenzamido)-3,4-dimethyl-Δ²-cephem-4-carboxylic acid,
7-(4-ethoxybenzamido)-3,4-dimethyl-Δ²-cephem-4-carboxylic acid,
7-(2,6-dimethoxybenzamido)-3,4-dimethyl-Δ²-cephem-4-carboxylic acid, 7-(2,4,6-trimethylbenzamido)-3,4-dimethyl-Δ²-cephem-4-carboxylic acid,
7-(2,6-dichlorobenzamido)-3,4-dimethyl-Δ²-cephem-4-carboxylic acid,
7-(2,6-diethoxybenzamido)-3,4-dimethyl-Δ²-cephem-4-carboxylic acid,
7-(2,6-di-n-butoxybenzamido)-3,4-dimethyl-Δ²-cephem-4-carboxylic acid,
7-(2,6-dibenzyloxybenzamido)3,4-dimethyl-Δ²-cephem-4-carboxylic acid,
7-(2,3,6-trimethoxybenzamido)-3,4-dimethyl-Δ²-cephem-4-carboxylic acid,
7-(2,4,6-tribromobenzamido)-3,4-dimethyl-Δ²-cephem-4-carboxylic acid,
7-(2,6-di-n-propoxybenzamido)-3,4-dimethyl-Δ²-cephem-4-carboxylic acid,
7-(2,6-dimethoxy-4-methylbenzamido)-3,4-dimethyl-Δ²-cephem-4-carboxylic acid,
7-(4,6-diethyl-2-methoxybenzamido)-3,4-dimethyl-Δ²-cephem-4-carboxylic acid,
7-(6-ethoxy-2-methoxybenzamido)-3,4-dimethyl-Δ²-cephem-4-carboxylic acid,
7-(2-methylthiobenzamido)-3,4-dimethyl-Δ²-cephem-4-carboxylic acid,
7-(2-benzylthiobenzamido)-3,4-dimethyl-Δ²-cephem-4-carboxylic acid,
7-(2-phenoxybenzamido)-3,4-dimethyl-Δ²-cephem-4-carboxylic acid,
7-(2-phenylbenzamido)-3,4-dimethyl-Δ²-cephem-4-carboxylic acid,
7-(2-methoxybenzamido)-3,4-dimethyl-Δ²-cephem-4-carboxylic acid,
7-(4-sulfamylbenzamido)-3,4-dimethyl-Δ²-cephem-4-carboxylic acid,
7-(3,4-dimethoxybenzamido)-3,4-dimethyl-Δ²-cephem-4-carboxylic acid,
7-(4-methoxybenzamido)-3,4-dimethyl-Δ²-cephem-4-carboxylic acid,
7-(3-methylbenzamido)-3,4-dimethyl-Δ²-cephem-4-carboxylic acid,
7-(3-dimethylaminobenzamido)-3,4-dimethyl-Δ²-cephem-4-carboxylic acid,
7-(2-methoxybenzamido)-3,4-dimethyl-Δ²-cephem-4-carboxylic acid,
7-(2-chloro-3,4,5-trimethoxybenzamido)-3,4-dimethyl-Δ²-cephem-4-carboxylic acid,
7-(2,4-dichlorobenzamido)-3,4-dimethyl-Δ²-cephem-4-carboxylic acid acid,
7-(2-nitrobenzamido)-3,4-dimethyl-Δ²-cephem-4-carboxylic acid,
7-(4-methylaminobenzamido)-3,4-dimethyl-Δ²-cephem-4-carboxylic acid,
7-(2-acetamidobenzamido)-3,4-dimethyl-Δ²-cephem-4-carboxylic acid,
7-(2,4-dimethylbenzamido)-3,4-dimethyl-Δ²-cephem-4-carboxylic acid,
7-(2,4,5-trimethylbenzamido)-3,4-dimethyl-Δ²-cephem-4-carboxylic acid,
7-(4-isopropylbenzamido)-3,4-dimethyl-Δ²-cephem-4-carboxylic acid,
7-(3-bromobenzamido)-3,4-dimethyl-Δ²-cephem-4-carboxylic acid,
7-(2-iodobenzamido)-3,4-dimethyl-Δ²-cephem-4-carboxylic acid,
7-(2-ethylaminobenzamido)-3,4-dimethyl-Δ²-cephem-4-carboxylic acid,
7-(2,5-dihydroxybenzamido)-3,4-dimethyl-Δ²-cephem-4-carboxylic acid,
7-(4-hydroxy-3-methoxybenzamido)-3,4-dimethyl-Δ²-cephem-4-carboxylic acid,
7-(4-allylbenzamido)-3,4-dimethyl-Δ²-cephem-4-carboxylic acid,
7-(4-allyloxybenzamido)-3,4-dimethyl-Δ²-cephem-4-carboxylic acid,
7-(2-trifluoromethylbenzamido)-3,4-dimethyl-Δ²-cephem-4-carboxylic acid,
7-(4-fluorobenzamido)-3,4-dimethyl-Δ²-cephem-4-carboxylic acid,
7-(2-phenylthiobenzamido)-3,4-dimethyl-Δ²-cephem-4-carboxylic acid,
7-(2-benzylbenzamido)-3,4-dimethyl-Δ²-cephem-4-carboxylic acid,
7-(2,6-dihydroxybenzamido)-3,4-dimethyl-Δ²-cephem-4-carboxylic acid,
7-(2,6-diacetoxybenzamido)-3,4-dimethyl-Δ²-cephem-4-carboxylic acid,
7-(2,6-dimethylthiobenzamido)-3,4-dimethyl-Δ²-cephem-4-carboxylic acid,
7-(2,4,6-trinitrobenzamido)-3,4-dimethyl-Δ²-cephem-4-carboxylic acid,
7-(2,6-diacetamidobenzamido)-3,4-dimethyl-Δ²-cephem-4-carboxylic acid,
7-(2,6-dibromobenzamido)-3,4-dimethyl-Δ²-cephem-4-carboxylic acid,
7-(2,6-dimethylbenzamido)-3,4-dimethyl-Δ²-cephem-4-carboxylic acid,
7-(2,6-diethylbenzamido)-3,4-dimethyl-Δ²-cephem-4-carboxylic acid,
7-(2,6-diisopropylbenzamido)-3,4-dimethyl-Δ²-cephem-4-carboxylic acid,
7-(2,6-diallyloxybenzamido)-3,4-dimethyl-Δ²-cephem-4-carboxylic acid,
7-(3-bromo-2,6-dimethoxybenzamido)-3,4-dimethyl-Δ²-cephem-4-carboxylic acid,
7-(4-chloro-2,6-dimethoxybenzamido)-3,4-dimethyl-Δ²-cephem-4-carboxylic acid,
7-(2-chloro-6-nitrobenzamido)-3,4-dimethyl-Δ²-cephem-4-carboxylic acid, and
7-(2-hydroxy-6-methoxybenzamido)-3,4-dimethyl-Δ²-cephem-4-carboxylic acid, respectively.

EXAMPLES 171–181

By following the procedure of Example 9(a) and substituting an equivalent amount of the corresponding acid chloride of the following carboxylic acids (4-nitrophenyl)acetyl chloride,
(4-bromophenyl)acetyl chloride,
(4-t-butylphenyl)acetyl chloride,
(4-trifluoromethylphenyl)acetyl chloride,
(3-fluorophenyl)acetyl chloride,
(4-sulfamylphenyl)acetyl chloride,
(2-benzylphenyl)acetyl chloride,
(3-methoxyphenyl)acetyl chloride,
(2-iodophenyl)acetyl chloride,
(3-diethylaminophenyl)acetyl chloride, and
(2,4-diisoamylphenyl)acetyl chloride, the products obtained are 7-[α-(4-nitrophenyl)acetamido]-3,4-dimethyl-Δ²-cephem-4-carboxylic acid,
7-[α-(4-bromophenyl)acetamido]3,4-dimethyl-Δ²-cephem-4-carboxylic acid,
7-[α-(4-t-butylphenyl)acetamido]-3,4-dimethyl-Δ²-cephem-4-carboxylic acid,
7-[α-(4-trifluoromethylphenyl)acetamido]-3,4-dimethyl-Δ²-cephem-4-carboxylic acid,
7-[α-(3-fluorophenyl)acetamido]-3,4-dimethyl-Δ²-cephem-4-carboxylic acid,
7-[α-(4-sulfamylphenyl)acetamido]-3,4-dimethyl-Δ²-cephem-4-carboxylic acid,
7-[α-(2-benzylphenyl)acetamido]-3,4-dimethyl-Δ²-cephem-4-carboxylic acid,
7-[α-(3-methoxyphenyl)acetamido]-3,4-dimethyl-Δ²-cephem-4-carboxylic acid,
7-[α-(2-iodophenyl)acetamido]-3,4-dimethyl-Δ²-cephem-4-carboxylic acid, 7-[α-(3-diethylaminophenyl)acetamido]-3,4-dimethyl-Δ²-cephem-4-carboxylic acid, and
7-[α-(2,4-diisoamylphenyl)acetamido]-3,4-dimethyl-Δ²-cephem-4-carboxylic acid, respectively.

EXAMPLES 182–196

By following the procedure of Example 9(a) and substituting an equivalent amount of the corresponding acid chloride of the following carboxylic acids 3,5-diphenyl-4-isoxazole-4-carbonyl chloride,
3-methyl-5-phenyl-4-isoxazole-4-carbonyl chloride,
3,5-dimethyl-4-isoxazole-4-carbonyl chloride,
5-benzyl-3-methyl-4-isoxazole-4-carbonyl chloride,
3-methyl-5-styryl-4-isoxazole-4-carbonyl chloride,
5-tert. butyl-3-phenyl-4-isoxazole-4-carbonyl chloride,
5-(2-furyl)-3-methyl-4-isoxazole-4-carbonyl chloride,
3-methyl-5-(3',5'-dimethyl-4'-isoxazolyl)-4-isoxazole-4-carbonyl chloride,
3-methyl-5-(2-thienyl)-4-isoxazole-4-carbonyl chloride,
3-(p-chlorophenyl)-5-methyl-4-isoxazole-4-carbonyl chloride,
3-methyl-5-methylmercapto-4-isoxazole-4-carbonyl chloride,
5-(p-chlorophenyl)-3-methyl-4-isoxazole-4-carbonyl chloride,
3-methyl-5-(o-nitrophenyl)-4-isoxazole-4-carbonyl chloride,
5-isopropyl-3-methyl-4-isoxazole-4-carbonyl chloride, and
5-methyl-3-(p-chlorophenyl)-4-isoxazole-4-carbonyl chloride, the products obtained are:

7-(3,5-diphenyl-4-isoxazolylcarbonylamino)-3,4-dimethyl-Δ²-cephem-4-carboxylic acid,
7-(3-methyl-5-phenyl-4-isoxazolylcarbonylamino)-3,4-dimethyl-Δ²-cephem-4-carboxylic acid,
7-(3,5-dimethyl-4-isoxazolylcarbonylamino)-3,4-dimethyl-Δ²-cephem-4-carboxylic acid,
7-(5-benzyl-3-methyl-4-isoxazolylcarbonylamino)-3,4-dimethyl-Δ²-cephem-4-carboxylic acid,
7-(3-methyl-5-styryl-4-isoxazolylcarbonylamino)-3,4-dimethyl-Δ²-cephem-4-carboxylic acid,
7-(5-tert. butyl-3-phenyl-4-isoxazolylcarbonylamino)-3,4-dimethyl-Δ²-cephem-4-carboxylic acid,
7-(5-(2-furyl)-3-methyl-4-isoxazolylcarbonylamino)-3,4-dimethyl-Δ²-cephem-4-carboxylic acid,
7-(3-methyl-5-(3',5'-dimethyl-4'-isoxazolyl)-4-isoxazolylcarbonylamido)-3,4-dimethyl-Δ²-cephem-4-carboxylic acid,
7-(3-methyl-5-(2-thienyl)-4-isoxazolylcarbonylamido)-3,4-dimethyl-Δ²-cephem-4-carboxylic acid,
7-(3-(p-chlorophenyl)-5-methyl-4-isoxazolylcarbonylamido)-3,4-dimethyl-Δ²-cephem-4-carboxylic acid,
7-(3-methyl-5-methylmercapto-4-isoxazolylcarbonylamido)-3,4-dimethyl-Δ²-cephem-4-carboxylic acid,
7-(5-(p-chlorophenyl)-3-methyl-4-isoxazolylcarbonylamido)-3,4-dimethyl-Δ²-cephem-4-carboxylic acid,
7-(3-methyl-5-(o-nitrophenyl)-4-isoxazolylcarbonylamido)-3,4-dimethyl-Δ²-cephem-4-carboxylic acid,
7-(5-isopropyl-3-methyl-4-isoxazolylcarbonylamido)-3,4-dimethyl-Δ²-cephem-4-carboxylic acid, and
7-(5-methyl-3-(p-chlorophenyl)-4-isoxazolylcarbonylamido)-3,4-dimethyl-Δ²-cephem-4-carboxylic acid, respectively.

EXAMPLES 197–210

By following the procedure of 9(a) and substituting an equivalent amount of the corresponding acid chloride hydrochloride of the following carboxylic acids α-(3-thienyl)glycyl chloride,
α-(5-ethyl-2-thienyl)glycyl chloride,
α-(5-methyl-2-thienyl)glycyl chloride,
α-(5-t-butyl-2-thienyl)glycyl chloride,
α-(2,5-dimethyl-3-thienyl)glycyl chloride,
α-(5-chloro-2-thienyl)glycyl chloride,
α-(5-bromo-2-thienyl)glycyl chloride,
α-(5-phenyl-3-chloro-2-thienyl)glycyl chloride,
α-(3,5-dimethyl-2-thienyl)glycyl chloride,
α-(5-cyclohexyl-2-thienyl)glycyl chloride,
α-(5-diethylamino-2-thienyl)glycyl chloride,
α-(4-methylsulfonyl-2-thienyl)glycyl chloride,
α-(3-ethylthio-2-thienyl)glycyl chloride, and
α-(4-cycloheptyloxy-2-thienyl)glycyl chloride, respectively, the products obtained are 7-[α-amino-(3-thienyl)acetamido]-3,4-dimethyl-Δ²-cephem-4-carboxylic acid"
D,L-7-[α-amino-(5-ethyl-2-thienyl)acetamido]3,4-dimethyl-Δ²-cephem-4-carboxylic acid,
7-[α-amino-(5-methyl-2-thienyl)acetamido]3,4-dimethyl-Δ²-cephem-4-carboxylic acid,
7-[α-amino-(5-t-butyl-2-thienyl)acetamido]-3,4-dimethyl-Δ²-cephem-4-carboxylic acid,
7-[α-amino(5-methyl-2-thienyl)acetamido]3,4-dimethyl-Δ²-cephem-4-carboxylic acid,
7-[α-amino-(5-chloro-2-thienyl)acetamido]-3,4-dimethyl-Δ²-cephem-4-carboxylic acid,
7-[α-amino-(5-bromo-2-thienyl)acetamido]-3,4-dimethyl-Δ²-cephem-4-carboxylic acid,
7-[α-amino-(5-phenyl-3-chloro-2-thienyl)acetamido]-3,4-dimethyl-Δ²-cephem-4-carboxylic acid,
7-[α-amino-(3,5-dimethyl-2-thienyl)acetamido]3,4-dimethyl-Δ²-cephem-4-carboxylic acid,
7-[α-amino-(5-cyclohexyl-2-thienyl)acetamido]-3,4-dimethyl-Δ²-cephem-4-carboxylic acid,
7-[α-amino-(5-diethylamino-2-thienyl)acetamido]-3,4-dimethyl-Δ²-cephem-4-carboxylic acid,
7-[α-amino-(4-methylsulfonyl-2-thienyl)acetamido]-3,4-dimethyl-Δ²-cephem-4-carboxylic acid,
7-[α-amino-(3-ethylthio-2-thienyl)acetamido]-3,4-dimethyl-Δ²-cephem-4-carboxylic acid, and
7-[α-amino-(4-cycloheptyloxy-2-thienyl)acetamido]-3,4-dimethyl-Δ²-cephem-4-carboxylic acid, respectively.

EXAMPLES 211–215

By following the procedure of Example 1 and substituting an equivalent amount of the following compounds for methyl iodide:

benzyl chloromethyl ether
dichloromethane
N,N-dimethylaminomethyl chloride
benzyl chloride
benzal chloride the products obtained are:

methyl 3-methyl-4-benzyloxymethyl-7-phenoxy-acetamido-Δ²-cephem-4-carboxylate, S-oxide,
methyl 3-methyl-4-chloromethyl-7-phenoxy-acetamido-Δ²-cephem-4-carboxylate, S-oxide;
methyl 3-methyl-4-(N,N-dimethylaminomethyl)-7-phenoxy-acetamido-Δ²-cephem-4-carboxylate, S-oxide;
methyl 3-methyl-4-(benzyl)-7-phenoxy-acetamido-Δ²-cephem-4-carboxylate, S-oxide; and
methyl 3-methyl-4-(phenylchloromethyl)-7-phenoxy-acetamido-Δ²-cephem-4-carboxylate, S-oxide.

EXAMPLES 216–221

By following the procedure of example 1 wherein one substitutes an equivalent amount of methyl 3-acetoxy-methyl-7-phenoxyacetamido-Δ³-cephem-4-carboxylate, sulfoxide for methyl 3-methyl-7-phenoxyacetamido-Δ³- cephem-4-carboxylate sulfoxide and reacts said material with:

methyl iodide
benzyl chloromethyl ether
dichloromethane
N,N-dimethylaminomethyl chloride
benzyl chloride
benzal chloride the products obtained are:

methyl 3-acetoxymethyl-4-methyl-7-phenoxyacetamido-Δ²-cephem-4-carboxylate, S-oxide,
methyl 3-acetoxymethyl-4-benzyloxymethyl-7-phenoxyacetamido-Δ²-cephem-4-carboxylate, S-oxide,
methyl 3-acetoxymethyl-4-chloromethyl-7-phenoxyacetamido-Δ²-cephem-4-carboxylate, S-oxide,
methyl 3-acetoxymethyl-4-(N,N-dimethylaminomethyl)-7-phenoxy-acetamido-Δ²-cephem-4-carboxylate, S-oxide
methyl 3-acetoxymethyl-4-benzyl-7-phenoxyacetamido-Δ²-cephem-4-carboxylate, S-oxide, and
methyl 3-acetoxymethyl-4-(phenylchloromethyl)-7-phenoxy-acetamido-Δ²-cephem-4-carboxylate, S-oxide.

The compounds of this invention have a broad spectrum of antibiotic activity. They have antibacterial activity against microorganisms, such as *Staphylococcus aureus*, and *Streptococcus pyogenes*. They may be used as antibacterial agents in a prophylactic manner, e.g., in cleaning or disinfecting compositions, or otherwise to combat infections due to organisms such as those named above, and in general may be utilized in a manner similar to cephalothin, cephalexin, cephaloridine and other cephalosporins. For example, a compound of Formula I may be used in various animal species in an amount of about 0.1 to 100 mg./kg. daily.

What is claimed is:
1. A compound having the formula

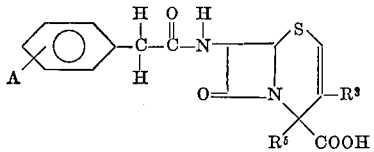

wherein $R^3$ is alkyl of 1 to 6 carbons; $R^5$ is selected from the group consisting of alkyl of 1 to 6 carbons, chloromethyl, dimethylaminomethyl, benzyl, benzyloxymethyl and phenylchloromethyl; and A is selected from the group consisting of hydrogen, alkyl of 1 to 6 carbons, methoxy, halo, nitro, trifluoromethyl, sulfamyl, and diethylamino.

2. The compound of claim 1 wherein $R^5$ is alkyl of 1 to 6 carbons.

3. The compound of claim 2 wherein $R^3$ and $R^5$ are each methyl.

4. The compound of claim 3 having the name 7-phenylacetamido-3,4-dimethyl-Δ²-cephem-4-carboxylic acid.

References Cited
UNITED STATES PATENTS 3,507,861    4/1970    Morin et al. _____ 260—243 C NICHOLAS S. RIZZO, Primary Examiner U.S. Cl. X.R.
424—246

UNITED STATES PATENT OFFICE
CERTIFICATE OF CORRECTION

Patent No. 3,849,408　　　　　　　　　Dated November 19, 1974

Inventor(s) Joseph Edward Dolfini

It is certified that error appears in the above-identified patent and that said Letters Patent are hereby corrected as shown below:

Col. 1, lines 20 and 21, "now abandoned" should appear after "filed May 3, 1971."

Col. 1, formula I, "$\overset{O}{\overset{\|}{C}}R$" should read -- $\overset{O}{\overset{\|}{C}}R$ --.

Col. 1, line 71, "arylalkoxalkyl" should read --arylalkoxyalkyl--.

Col. 3, formula VI, "COOR" should read --COOH--.
Col. 3, line 58, "acid employed" should read --acid may be employed--.
Col. 4, line 11, "provious" should read --previous--.
Col. 4, lines 74 and 75, cancel "the pH being adjusted to 3.0 for 2 hours at room temperature,".
Col. 6, line 43, cancel "the" at its first occurrence.
Col. 7, line 18, "orthonitrophenylthiopropionamido" should read --ortho-nitrophenylthiopropionamido--.
Col. 7, line 60, "butyramido]3,4" should read --butyramido]-3,4--.
Col. 8, line 4, "αamino" should read --α-amino--.
Col. 11, line 48, cancel "acid" at its second occurrence.
Col. 14, line 18, insert a hyphen before "3,4".
Col. 14, line 20, insert a hyphen before "3,4".
Col. 14, line 24, "(5-methyl-2-thienyl)acetamido]3,4" should read --(2,5-dimethyl-3-thienyl)acetamido]-3,4--.
Col. 14, line 32, insert a hyphen before "3,4".
Col. 15, line 27, "pyogenes" should read --pyrogenes--.

Signed and sealed this 11th day of March 1975.

(SEAL)
Attest:

RUTH C. MASON
Attesting Officer

C. MARSHALL DANN
Commissioner of Patents
and Trademarks